Aug. 16, 1966   D. L. ROBERTS   3,266,587
AUTOMOBILE PARKING ATTACHMENT
Filed Oct. 20, 1964   2 Sheets-Sheet 1

1

3,266,587
AUTOMOBILE PARKING ATTACHMENT
David Leslie Roberts, Victoria Road, Oswestry, England
Filed Oct. 20, 1964, Ser. No. 405,225
6 Claims. (Cl. 180—1)

This invention relates to a wheel assembly for use in parking or moving a vehicle, especially but not exclusively into or out of a confined space, and to a vehicle incorporating such a wheel assembly.

The present invention is in a vehicle having a longitudinal transmission shaft, a pair of axles disposed transversely to the transmission shaft, a ground-engaging road wheel supported at each end of each axle, and suspension means disposed between the axles and the vehicle, a wheel assembly for use in parking or moving the vehicle, and comprising a pair of transversely-spaced arms pivotally connected to the underside of the vehicle for movement in a transverse plane, the arms being of a length greater than the distance between the underside of the vehicle and the ground, a ground-engaging wheel carried at the pivot-remote end of each arm, a driving wheel at the other end of each arm and engageable with the transmission shaft drive means operatively connecting the driving wheel and the ground-engaging wheel of each arm, a piston-and-cylinder device connected between each arm and the underside of the vehicle to effect pivoting movement of the arms from a substantially horizontal position, wherein the driving wheels are spaced from the transmission shaft and the ground-engaging wheels are clear of the ground, downwardly and inwardly to a substantially upright position wherein the driving wheels are in driving engagement with the transmission shaft, the ground-engaging wheels are in contact with the ground, and the vehicle suspension means is compressed due to the length of the arms, and vice versa.

An embodiment of the present invention will now be described, by way of example, with reference to the accompanying drawings, in which.

Figure 1:
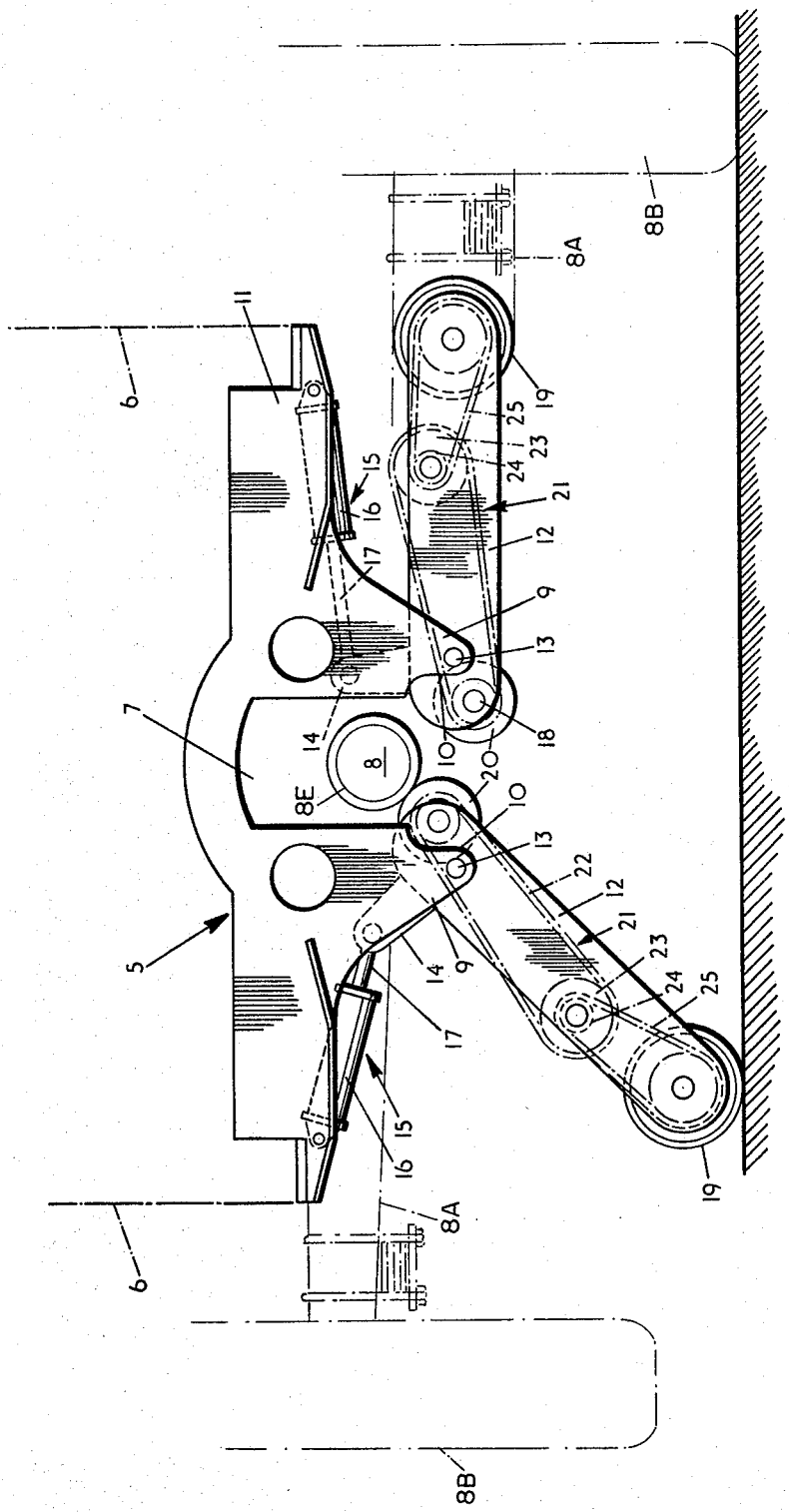
FIG. 1 is a view of the wheel assembly according to the present invention from the front of a vehicle.

In this embodiment of the present invention the vehicle is a four wheel, motor-driven vehicle with its engine at the front and with the customary transmission shaft 8, two transverse axles 8A, only one of which is shown, a road wheel 8B at each end of each axle 8A, and leaf spring suspension means 8D between the axles 8A and the underside of the vehicle.

Referring to the drawings, the wheel assembly comprises a transversely-extending support member 5 bolted or otherwise attached to the underside of the vehicle 6 adjacent the rear thereof. The shape of the support member 5 can be varied to suit the requirements of different types and/or makes of vehicle. In this embodiment, the support member 5 has a central recess 7 in which is accommodated the vehicle transmission shaft 8, two depending lugs 9, each being cut away as indicated at 10, and two side wings 11.

An arm 12 is pivoted to each lug 9 as indicated at 13, and is of such a length that, when in a depending position substantially normal to the support member 5, it raises the corresponding normal rear wheel of the vehicle clear of the ground. Each arm 12 has at its inner or top end a lug 14 at substantially right angles thereto. The lug 14 of each arm 12 is connected to the corresponding wing 11 of the support member 5 by a double-acting hydraulic ram 15, whereof the cylinder 16 is pivoted to the wing 11 and the piston rod 17 is pivoted to the lug 14.

A road wheel 19 is rotatably carried at the bottom of each arm 12, the road wheels 19 being transversely directed. Each arm 12 has at its top a wheel 20 rotatable about an axis 18 and drivingly connected to the corresponding wheel 19 by endless reduction drive means 21. In this embodiment each wheel 20 is connected by a belt or chain 22 to a pulley or sprocket wheel 23 which directly drives a smaller pulley or sprocket wheel 24 connected to the wheel 19 by a further belt or chain 25. Thus rotation of wheels 20 is imparted to wheels 19 but at a reduced speed. Alternatively, a gear reduction drive, or a worm drive or shaft drive may be employed to drivingly connect each pair of wheels 19 and 20.

The wheels 19 are driven by the frictional engagement of the wheels 20 with a friction wheel 8E on the prop shaft 8. This friction wheel 8E may be omitted and the wheels 20 will frictionally engage the shaft 8 directly. This frictional engagement is attained by causing the hydraulic rams 15 to pivot the arms 12 about their pivots 13 from the position shown at the right hand side of FIG. 1 to the position shown at the left hand side of FIG. 1 only more vertical, the cut away portions 10 ensuring that the movement of the axes 18 is not impeded.

Figure 3:
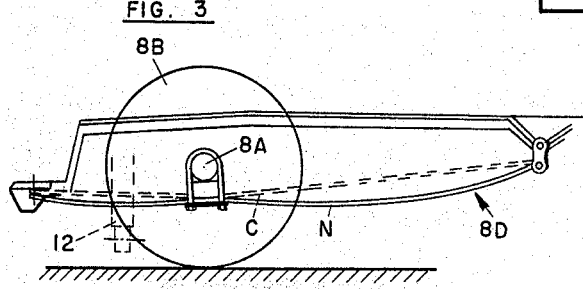

When the arms 12 are in their in use position, the prop shaft 8 is raised vertically due to the length of the arms and the upward pressure exerted by the engagement between the wheels 20 and friction wheel 8E. This causes compression of the leaf spring suspension means 8D as shown in FIG. 3 in which the original position of the leaf spring suspension means 8D is indicated at N and the compressed position at C. If independent suspension is employed this is prevented from dropping in a similar manner.

Figure 2:
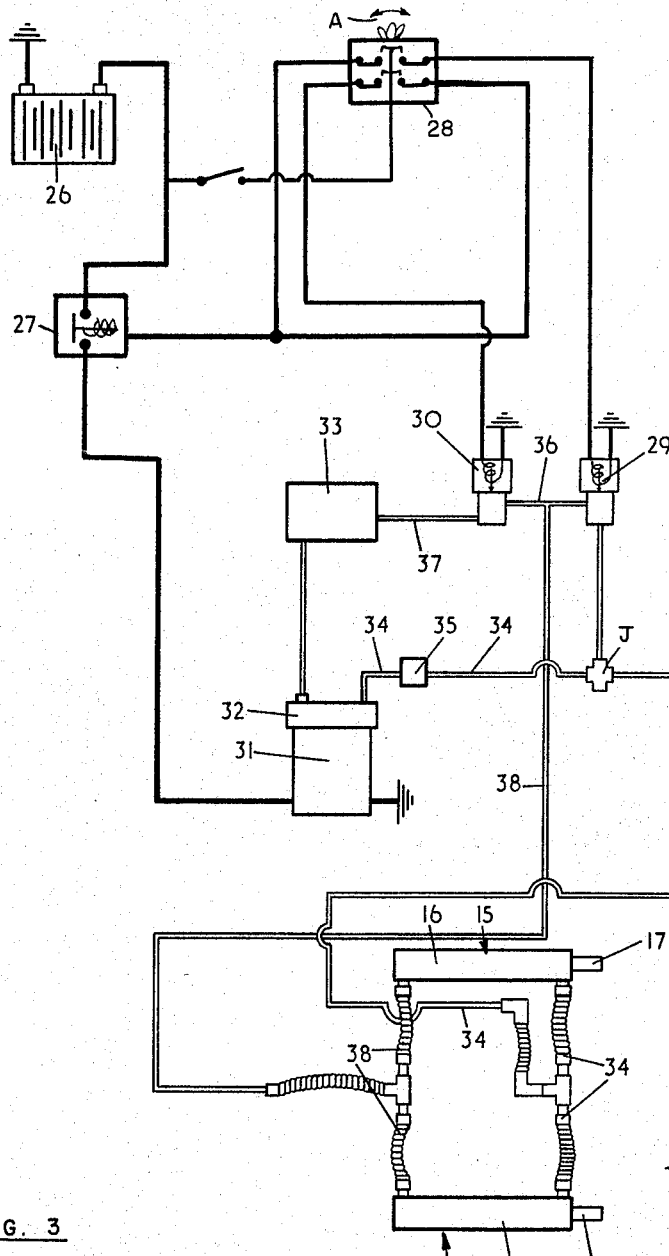
FIG. 2 is a diagram of an electrohydraulic control circuit for effecting movement of the wheel means; and, FIG. 3 is a diagrammatic view showing the vehicle spring suspension when the parking wheel assembly is not in use and when it is in use.

Movement of the hydraulic rams 15 is controlled by the circuit shown in FIG. 2.

The electrohydraulic control circuit comprises a battery 26 or other source of electrical power, a solenoid 27 connected to the battery 26 and via a two-way switch 28 to two normally-closed valves 29 and 30 in the hydraulic circuit. The switch actuator A is spring-urged to a neutral central position. The solenoid 27 is also connected to an electric motor 31, say twelve volt, which is connected to earth. The battery 26 and valves 29, 30 are earthed.

The motor 31 is directly connected to a hydraulic pump 32 connected to an oil supply tank 33. The pump 32 is also connected via a pipeline 34 incorporating a one-way valve 35 to one end of the ram cylinders 16. The valves 29 and 30 are connected by a pipe 36 and the valve 30 and supply tank 33 are connected by a pipe 37. The pipe 36 is conected to the other end of the ram cylinders 16 by a pipeline 38. The valve 29 is connected to pipeline 34 via a junction member J.

When it is desired to park or position the above described motor vehicle in a confined space, say between two motor vehicles at a curbside, the driver of the vehicle stops same adjacent the space and steers the front of the vehicle into the space. He then arrests the movement of the vehicle and operates the switch 28 to its position whereat it causes energisation of motor 31 and the solenoid 27 to open valve 30. The pump 32 is driven by the motor 31 to feed oil from the tank 32 along pipeline 34 via one-way valve 35 to the cylinders 16 of the rams 15 which incorporate differential area pistons, thus causing retraction of the piston rods 17 and pivotal movement of the arms 12 to their substantially vertical position, whereby the rear wheels of the vehicle are raised clear of the ground and the wheels 20 are in frictional engagement with the vehicle prop shaft 8 and the wheels 19 contact the ground. Oil flows from the other end of the cylinders 16 via pipeline 38, pipe 36, open valve 30 and the pipe 37 to the supply tank 33. The driver of the vehicle then engages either first or reverse gear depending on whether the vehicle is to be moved into the right or left and the rear of the vehicle is moved into the confined space transversely alongside the curb by the driven wheels 19.

When the vehicle is parked or positioned to the driver's satisfaction, he then actuates switch 28 to its other position to close valve 30 and open valve 29 whereupon oil is delivered to the other end of cylinders 16 via valve 35, pipeline 34, open valve 29 pipe 36 and pipeline 38, the oil in the other end of the rams 15 being entrapped between the ram pistons and the closed valve 30. This action, due to the differential area of the ram pistons, causes extension of the piston rods 17 pivoting the arms 12 upwardly to the position shown in the right hand side of FIG. 1 thus lowering the rear of the vehicle until its normal rear wheels engage the ground.

A further switch (not shown) is provided in the circuit and is actuable by one of the legs 12 when in its fully withdrawn or horizontal position and its fully extended or vertical position to disconnect the motor 31 from the circuit and so arrest the movement of the pump 32.

It will be manifest that the wheel assembly can be employed to move the vehicle out of a confined space, or alternatively it may be employed simply to manoeuvre the vehicle, for example to turn it in a circle.

The wheel assembly may be bolted to the front of the vehicle if the latter has its engine at the rear.

Two wheel assemblies may be employed, one at the front and one at the rear, to raise all the vehicle wheels clear of the ground and in this case the vehicle is moved bodily sideways. In a modification of this arrangement, there is a single assembly having three or four wheels disposed centrally of the vehicle.

In the above described embodiment, the wheel 20 frictionally engage the prop shaft 8, or a friction wheel fast thereon. However, in an alternative arrangement, the wheels 20 may be gear wheels which are movable into meshing engagement with a gear wheel fast on the prop shaft. In a modification, only one of the wheels 19 is driven, the other or others being simply freely rotatable.

The support member 5 may be omitted and the arms 12, hydraulic rams 15 and associated parts may be connected directly to the underside or other convenient parts of the vehicle.

The pump 32 may be driven from any rotating part of the vehicle engine or transmission and, in this case, the motor 31 is omitted. Furthermore, the pump 32 may be omitted if an existing pump on the vehicle is employed.

What is claimed is:

1. In a vehicle having a lonitudinal transmission shaft, a pair of axles disposed transversely to the transmission shaft, a ground-engaging road wheel supported at each end of each axle, and suspension means disposed between the axles and the vehicle, a wheel assembly for use in parking or moving the vehicle and comprising a pair of transversely-spaced arms pivotally connected to the underside of the vehicle for movement in a transverse plane, the arms being of a length greater than the distance between the underside of the vehicle and the ground, a ground-engaging wheel carried at the pivot-remote end of each arm, a driving wheel at the other end of each arm and engageable with the transmission shaft, drive means operatively connecting the driving wheel and the ground-engaging wheel of each arm, a piston-and-cylinder device connected between each arm and the underside of the vehicle to effect pivoting movement of the arms from a substantially horizontal position, wherein the driving wheels are spaced from the transmission shaft and the ground-engaging wheels are clear of the ground, downwardly and inwardly to a substantially upright position wherein the driving wheels are in driving engagement with the transmission shaft, the ground-engaging wheels are in contact with the ground, and the vehicle suspension means is compressed due to the length of the arms, and vice versa.

2. A vehicle according to claim 1, comprising a transverse support beam attached to the underside of the vehicle and on to which the arms are pivoted and the piston-and-cylinder devices are connected.

3. A vehicle according to claim 1, comprising a driving element fast on the transmission shaft and engageable by the driving wheels.

4. A vehicle according to claim 1, in which each piston-and-cylinder device is a double-acting hydraulic ram, and an electrohydraulic control circuit is provided to effect actuation of the rams.

5. A vehicle according to claim 4, in which the electrohydraulic control circuit comprises a two-position control switch in a position in the vehicle accessible to the driver, a source of hydraulic liquid, an electrically driven pump connected to said source, and a pair of normally-closed, solenoid-operated valves operated by said switch so that only one valve is opened at any instant and disposed in hydraulic liquid feedlines between said source and both ends of each ram to move the ram pistons in accordance with the position of the switch.

6. A vehicle according to claim 1, in which the drive means is an endless drive.

References Cited by the Examiner

UNITED STATES PATENTS

| 1,639,054 | 8/1927 | Palmer | 180—1 |
| 1,736,498 | 11/1929 | Jensen | 180—1 |
| 1,760,643 | 5/1930 | Granstedt | 180—1 |
| 2,638,995 | 5/1953 | Gottlieb | 180—1 |
| 2,708,002 | 5/1955 | Carpenter | 180—1 |
| 2,746,554 | 5/1956 | Matthews | 180—1 |

FOREIGN PATENTS 563,083   5/1957   Italy.

A. HARRY LEVY, *Primary Examiner.*